…

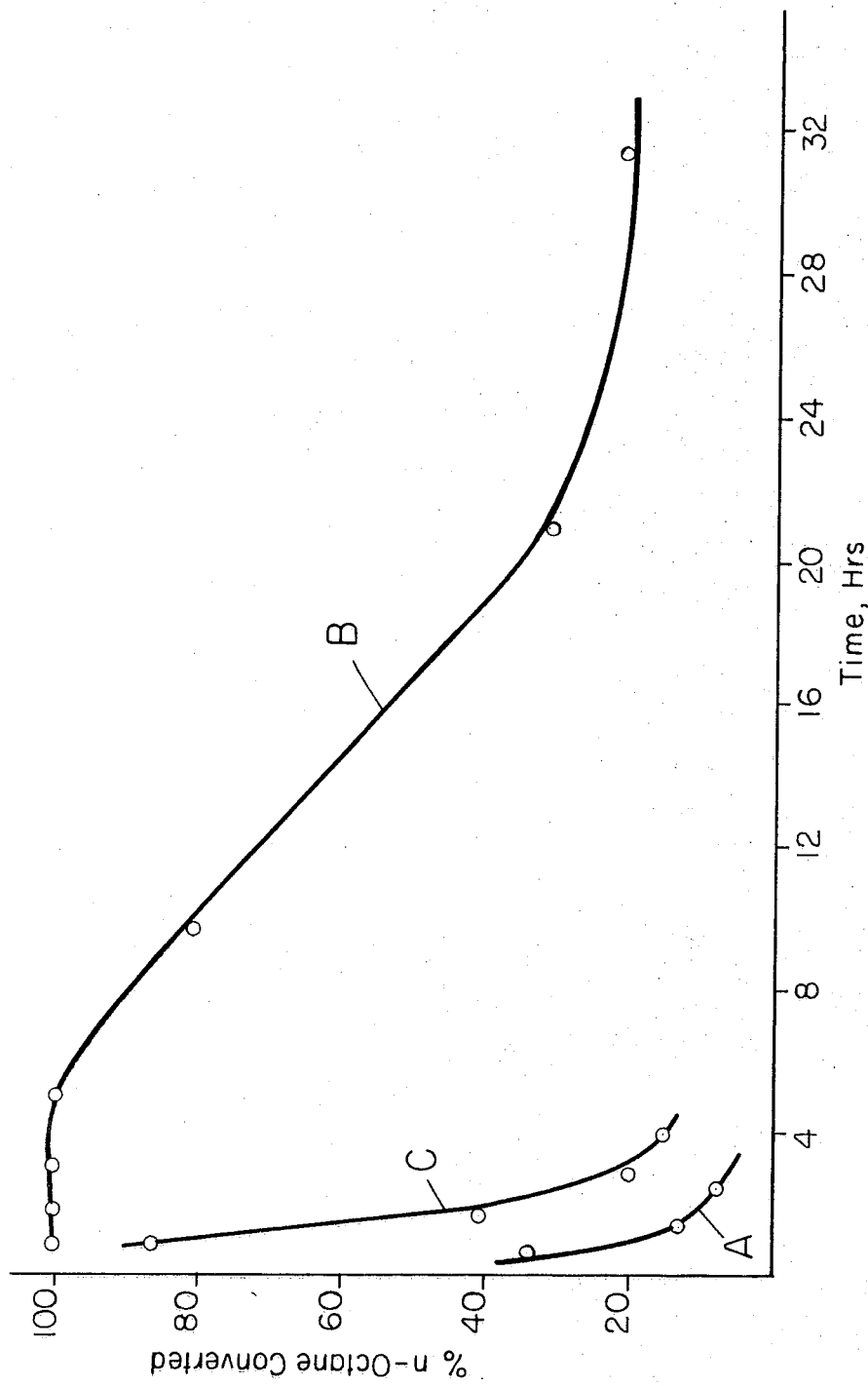

3,840,475
BIMETALLIC CATALYST PREPARATION
Burtron H. Davis, Keyser, W. Va., assignor to
Mobil Oil Corporation
Filed Feb. 19, 1971, Ser. No. 116,846
Int. Cl. B01j *11/08, 11/22, 11/78*
U.S. Cl. 252—441                                 4 Claims

ABSTRACT OF THE DISCLOSURE

A new method of making supported bimetallic hydrocarbon conversion catalysts is disclosed, in which two metals are simultaneously deposited on the support in the form of a coordination complex containing both of them. Certain new bimetallic catalysts are also disclosed; as well as new hydrocarbon conversion processes catalysed by bimetallic catalysts in accordance with the invention.

BACKGROUND OF THE INVENTION

1. Field

Figure 1:
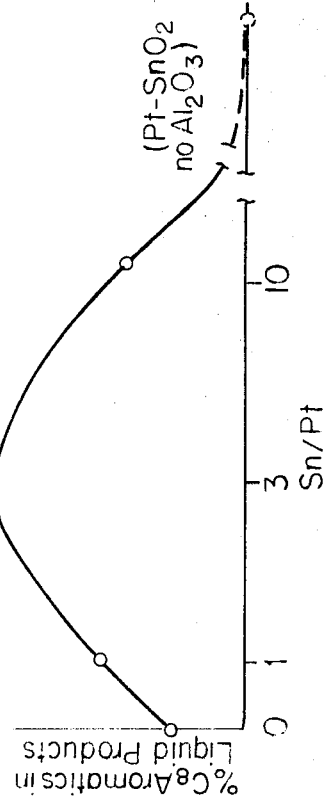

This invention relates to bimetallic hydrocarbon conversion catalysts, their preparation and use.

2. Description of Prior Art

Bimetallic catalysts for hydrocracking are known, for instance from U.S. Pat. 3,487,007 directed to hydrocracking over a catalyst comprising nickel and tin on a porous inorganic oxide carrier. The use of this catalyst is therein proposed because of its reversible sensitivity to the presence of sulphur in the hydrocracking reaction zone. The degree of aromatization which occurs on hydrocracking can thus be varied, by varying feed sulphur level, to furnish products of varying character. The nickel-tin catalyst may be prepared by simultaneous or separate precipitations of nickel and tin, upon the carrier, from individual solutions of their salts.

SUMMARY OF THE INVENTION

According to the invention a method of preparing a supported bimetallic catalyst containing tin and a transition metal catalytically active in hydroprocessing reactions comprises intimately associating a porous supporting material with a compound capable on ionization of furnishing a complex ion containing both said transition metal and tin.

From another aspect the invention resides in a method of preparing a bimetallic, inorganic-oxide-supported catalyst which comprises decomposing a compound which contains both metals in a single complex when said compound is in intimate association with said oxide. The complex may be generally represented by the formula $$[L_xMM'L_y]^n$$

in which M and M' are the different metals and $n$ is positive, zero or negative depending on the charge of the ligand or ligands $L_x$ and $L_y$.

The methods hereinabove set forth at least initially result in the creation of a composite in which the two metals are more closely associated with one another than has heretofore been known, such association being regardable as a promotion of one metal by the other, or as the formation of a cocatalyst of the one with the other. Accordingly, the invention further comprehends a particularly desirable embodiment of such promotion or cocatalysis, which is a platinum group metal catalyst promoted with tin. Furthermore, useful catalysts result even when one of the metals is in the elementary state whilst the other remains compounded. Accordingly, the invention provides a new class of catalysts comprising a transition metal promoted with the halide of a different metal, in which class a preferred elementary transition metal is a metal from the platinum group while a preferred metal halide is tin chloride. The halide may also be that of a transition metal. The invention is also concerned with unique catalytic processes which may be realized by the use in them of the catalysts hereinabove set forth, and with conventional catalytic processes the effectiveness of which is increased by the use of such catalysts.

DESCRIPTION OF SPECIFIC EMBODIMENTS

Many bimetallic complex ions are known, and the method of the invention basically consists in impregnating a porous inorganic oxide supporting material with an appropriate solution of such a complex and removing the solvent after impregnation. The complex may be preformed or may be formed during the catalyst preparation by mixing solutions of salts of the individual metals before impregnation of the support. Alternatively the support may be separately impregnated with solutions of salts of the individual metals. For example, in preparing a platinum-tin catalyst, chloroplatinic acid and tin chloride may be first mixed and the thus formed solution containing platinum-tin complex ion used to impregnate alumina; or either of them may be used to impregnate alumina, the resulting composite dried, and then the other used to impregnate the alumina with in situ formation of the complex. Representative transition metals forming a first metallic component of the catalyst according to the invention are preferably those of the platinum group, namely ruthenium, rhodium, palladium, osmium, iridium and platinum. The other metals of Group VIII are, however, also contemplated as desirable, namely iron, cobalt and nickel; and any transition metal (which term as used herein denotes an element having an incomplete inner electron shell) may be used in the method of the invention provided it is capable of forming a complex ion with a different metal, which different metal may itself be a transition metal. The only requirement of the second metal is that it, too, be capable of forming such a complex ion: however, two particularly preferred second metallic components are tin and rhenium.

At least part of the second, or "promoting" metal may be in the form of its halide in the finished catalyst, depending upon the degree to which the bimetallic complex ion is decomposed by the final stages of the catalyst preparation and activation procedure. It is, in fact, speculated that halogen and metal, particularly chlorine and tin, can both act as ligands associated with a primary catalytic component such as platinum and modify the catalytic properties of the platinum in their individually different ways. This role of one metal as ligand to the other can be expressed also as the joining of the two metals, in the final catalyst, by metal-to-metal valence bonds.

The proportions in which the two metals should be present in the catalyst depends upon their particular identities and upon the nature and economics of the specific conversion for which the catalyst is intended. By way of example, it has been found that the optimum platinum/tin atomic ratio is a non-acidic alumina-supported aromatization catalyst is in the range of approximately 1:3 to 1:4. Excellent results in aromatization have been obtained with a platinum/rhenium catalyst in which the atomic ratio Pt:Re was 3:2.

The character of the inorganic oxide support or carrier likewise varies with the particular conversion contemplated for the catalyst. Any of the conventional support materials, including inorganic oxides, inorganic oxide gels, clays and crystalline aluminosilicate zeolites, may be used, the selection of the specific material being made with a view to enhancing desirable conversion characteristics. As will be later set forth, many catalysts according to this invention have unusual utility in reforming operations generally, and in aromatization specifically. By way of example of selection of supporting material, it has been found that for reforming operations a desirable support is acidic (i.e. chloride-containing) alumina whereas if aromatization of paraffins is required to proceed selectively the desirable support is non-acidic alumina. Clearly, advantage can be taken, if required, of the size- and/or shape-selective properties of a crystalline aluminosilicate zeolite support by selecting as support such a zeolite with a port size which will exclude from the active bimetallic sites any charge molecules having an effective diameter smaller than that of the ports of the zeolite. Conversion characteristics may in addition be modified by selection of zeolite cations which modify the inherent activity of the zeolite in a desired manner.

When an inorganic oxide gel is used as support the compositing of gel and bimetallic component may be carried out on the dried or calcined gel, or even on a hydrogel precursor of those forms of gel. The term "gel" includes both precipitated gels and all-embracing hydrogels; and further includes cogels and plural gels as well as coprecipitated gels. Typical oxides which may constitute such gels are silica, alumina, zirconia, magnesia, titania, boria, hafnia and mixtures thereof. The clays which may be employed as support include natural, chemically treated and thermally treated clays.

As has been previously stated a prime utility of the catalysts herein described resides in reforming type operations and in the specific reactions involved in reforming particularly dehydrocyclization. Generally speaking, the catalysts commend themselves, in comparison with the monometallic catalysts of the prior art, by either a higher activity, better selectivity or better aging property, and in some cases by an improvement in two or even all three of these properties.

Thus, a platinum-tin catalyst supported on non-acidic alumina, in accordance with the invention was more active in dehydrocyclization and more resistant to aging than a tin-free similar catalyst. Both platinum-tin and rhodium-tin catalysts in accordance with the invention produce far fewer bicyclic products than tin free catalysts, which enhances their aging properties in dehydrocyclization reactions; and their selectivity is still further improved by a low paraffin isomerization activity and a high o-xylene/ethylbenzene ratio in their reaction products. This superiority to the rhodium-tin catalyst persists even at operating pressure of 400 p.s.i.g.

A platinum-rhenium catalyst, prepared from a bimetallic complex in accordance with the invention showed, quite apart from excellent activity and selectivity in reforming-type reactions, a most remarkable resistance to aging. Thus, in one test in which the catalyst was being evaluated for reforming of a naphtha feed the test unit had to be closed down (due to malfunction) after 3 to 4 hours on stream. The run was restarted (the catalyst having remained in contact with the naphtha in the meantime) after a lapse of 2 days. After restart, catalyst temperature was increased by 20 to 30° F. increments, rather than by the normal practice of a virtually continuous slow increase. After 10 days operation the catalyst was still usefully active, which is even more remarkable having regard to the fact that it contained only 0.4–0.5% wt. chlorine.

The following Examples will illustrate some aspects of the invention without, of course, limiting the same.

EXAMPLE 1

3.2 g. $H_2PtCl_6 \cdot 6H_2O$ and 0.7 g. $SnCl_2 \cdot 2H_2O$ were distributed in 200 cc. acetone to give the orange-yellow platinum-tin complex ion. The solution was added to 200 g. alumina (prepared by aluminum isopropoxide hydrolysis followed by calcination in air at 600° C.). The orange-yellow complex was completely (by visual inspection) adsorbed on the solid. The acetone was evaporated at room temperature to yield a platinum-tin catalyst supported on alumina.

EXAMPLE 2

The procedure and quantities of Example 1 were used to prepare another catalyst, except that the chloroplatinic acid solution was first impregnated on the alumina and dried; and then the tin-acetone solution was added to the $Pt-Al_2O_3$. The solid immediately changed color from the light yellow to the yellow-orange color characteristic of the platinum-tin complex ion.

EXAMPLE 3

Dichlorobis (triphenylphosphine) nickel (II) was prepared by the procedure outlined in J. Am. Chem. Soc., 89 1600 (1967) (Itatani and Bailar). 1.5 g. of this Ni complex and 3.4 g. $SnCl_2 \cdot 2H_2O$ were dissolved in 60 cc. acetone. 30 g. of alumina (dried at 120° C.) was added, and the acetone removed by evaporation to leave a nickel-tin catalyst.

EXAMPLE 4

0.4 $(NH_4)_2PdCl_6$ and 1.3 g. $SnCl_2 \cdot 2H_2O$ were added to 150 cc. acetone. 30 g. of alumina (calcined at 550° C.) was added to this solution and the acetone evaporated at room temperature to yield a palladium-tin catalyst.

EXAMPLE 5

0.5 g. $RhCl_3$ and 1.5 g. $SnCl_2 \cdot 2H_2O$ were added to 100 cc. absolute alcohol, and 1.5 cc. concentrated hydrochloric acid added to effect solution. 30 g. alumina (calcined at 550° C.) was added to this solution and the ethanol evaporated at about 50° C. to yield a rhodium-tin catalyst.

EXAMPLE 6

A platinum-tin metal cluster anion $(Pt_3Sn_8Cl_{20})^{-4}$ was prepared according to the procedure outlined by Lindsey, Parshall, and Stolberg in Inorg. Chem. 5, 109, (1966). Alumina was added to an acetone solution of this complex to give a final platinum-tin catalyst containing 0.6% platinum by weight.

EXAMPLE 7

A 1,5-cyclo-octadiene platinum-tin cluster complex was prepared as outlined in Inorg. Chem. 5, 109 (1966), using excess diene. Alumina was impregnated with the solution (containing excess diene) to yield a final platinum-tin catalyst containing 0.6% platinum by weight.

EXAMPLE 8

This Example demonstrates the high o-xylene/ethylbenzene selectivity of two catalysts in accordance with the invention (relative to that of a similar monometallic catalyst). It also demonstrates the significance of the particular support chosen for the bimetallic catalyst in a particular conversion.

n-Octane was passed over 5 cc. (~4 g.) of each of 3 catalysts in a Vicor flow reactor at a flow rate (LHSV) of 0.3 at 900° F. and 1 p.s.i.g. prevailing pressure. The first catalyst was a conventional platinum on non-acidic alumina; the second was a platinum-tin catalyst in accordance with the invention, prepared by addition of $SnCl_2$ to the first catalyst. The third catalyst was prepared by impregnating non-acidic alumina with the platinum-tin complex $[PtCl_6]=[SnCl_2]$ to provide a final catalyst containing 0.6% wt. platinum and 1.4% wt. tin. The observations of the three runs are recorded in Table I:

TABLE I

| Catalyst | $C_8$-aromatic products, mole percent | | | |
|---|---|---|---|---|
| | Ethyl-benzene | Xylenes | | |
| | | p- | m- | o- |
| $Al_2O_3$-Pt | 48 | 1 | 1.9 | 49 |
| $Al_2O_3$-Pt with $SnCl_2$ | 45 | 45 | 45 | 55 |
| $Al_2O_3$ with $[PtCl]$-$[SnCl_2]$ | 32 | 2.9 | 6.3 | 59 |

It emerges clearly from these results that the two catalysts in accordance with the invention exhibit must better o-xylene/ethylbenzene selectivity than the conventional catalyst. It appears probable that this selectivity accounts for the better aging property of catalysts according to the invention, since ethylbenzene is much more susceptible to the further transformation to bicyclic compounds (which are coke precursors) than is o-xylene.

It is of interest to observe the results of a similar comparison in which the support is acidic: the results of that comparison appear in Table II:

TABLE II

| Catalyst | $C_8$-aromatic products, mole percent | | | |
|---|---|---|---|---|
| | Ethyl-benzene | Xylenes | | |
| | | p- | m- | o- |
| Pt-Cl-$Al_2O_3$ | 14 | 15 | 43 | 27 |
| Commercial Pt-$Al_2O_3$ (0.6% Pt) | 21 | 12 | 29 | 40 |
| $[PtCl_6]$-$(SnCl_2)$ on $Al_2O_3$ | 18 | 15 | 30 | 36 |

In each of these three runs there is a large yield of m- and p-xylene; and o-xylene does not comprise 50% of the total $C_8$-aromatic yield in any run, in contrast to the results reported in Table I.

For n-octane dehydrocyclization it has also been found that the ratio o-xylene/ethylbenzene increased as the Pt loading decreased from 0.6 to 0.2 wt. percent on "non-acidic" alumina. Significantly, this effect on $C_8$-aromatic distribution is quite similar to that observed with the tin-containing catalysts. However, this decrease of selectivity with increased platinum content is accompanied by an increase in the effectiveness of tin upon overall catalyst activity (either as metal or chloride) as platinum content increases. Hence an optimum has to be struck between the opposing tendencies.

EXAMPLE 9

The conversion characteristics demonstrated in Example 8 were further explored by comparison of the effect of tin (in accordance with the invention) on a platinum catalyst with the effect of thiophene addition to the feedstock (to a conventional platinum catalyst).

As shown in Table III, both tin addition (to the catalyst) and thiophene addition (to the feed) drastically diminish product bicyclic aromatic content:

TABLE III

Dehydrocyclization of n-nonane and n-decane over Pt on "non-acidic" alumina and moderated Pt-$Al_2O_3$ (482° C. and atmospheric pressure)

| Reactant | Pt-metal moderator | Total aromatic, g.c. area, percent | Bicyclic aromatic, g.c. area, percent | Bicyclic total cyclic |
|---|---|---|---|---|
| n-nonane | None | 42 | 21 | 0.5 |
| Do | Thiophene | 45 | 2 | 0.04 |
| Do | Tin | 66 | 1.2 | 0.02 |
| Do | None | 23 | 15 | 0.4 |
| Do | Thiophene | 45 | 4.3 | 0.1 |
| Do | Tin | 72 | 4.8 | 0.07 |

Also, in Table IV, the effect of platinum content upon o-xylene selectivity is demonstrated.

TABLE IV

Product distribution from dehydrocyclization of n-octane over Pt-$Al_2O_3$ ("non-acidic" alumina) and moderated Pt-$Al_2O_3$

| Catalyst | $C_8$-aromatic, mole percent | | | |
|---|---|---|---|---|
| | Ethylbenzene | p-Xylene | m-Xylene | o-Xylene |
| 0.6% Pt | 48.3 | 1.0 | 1.9 | 48.8 |
| Pt-Sn | 32.2 | 2.9 | 6.3 | 59.0 |
| Pt-Thiophene | 44.4 | Trace | Trace | 55.6 |
| 0.2% Pt | 43.0 | 43.0 | 43.0 | 57.0 |

It will be observed that both of the favorable effects of thiophene addition to the feed are appreciably more marked by use of the platinum-tin catalyst with a thiophene-free feed.

EXAMPLE 10

The effect, upon n-octane dehydrocyclization activity, of variation in the ratio Pt/Sn in a platinum-tin catalyst according to the invention, at constant platinum loading (0.6% wt. of the Sn-free catalyst, non-acidic alumina as support) was investigated. The results are shown in FIG. 1, where Sn/Pt ratio is plotted against percent $C_8$ aromatics in the products of conversion.

The indication furnished by FIG. 1 that a Pt/Sn ratio of approximately 1:3 is most effective in the particular reaction studied is, of course, additive to the effect of absolute platinum content shown in Table IV (above).

EXAMPLE 11

The performance, in n-octane dehydrocyclization, of a rhodium-tin catalyst in accordance with the invention was compared with that of a rhodium-alone catalyst (both catalyst contained equal quantities of rhodium, namely 0.6% wt., and included a non-acidic alumina carrier; the Rh/Sn mole ratio was 1:3).

Figure 3:
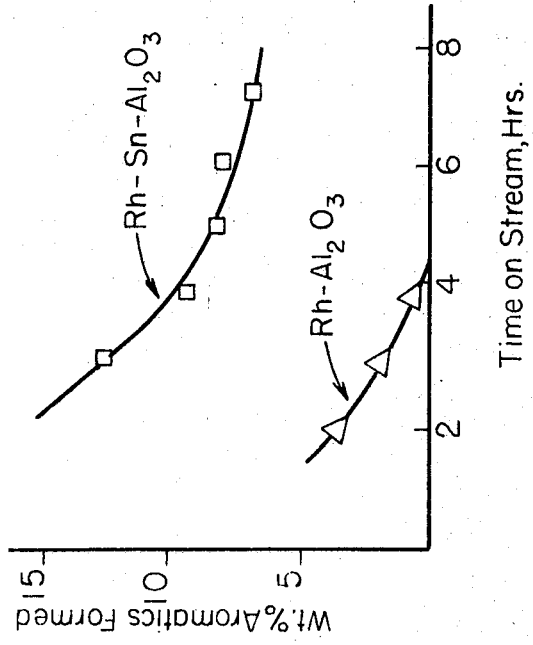
Figure 2:
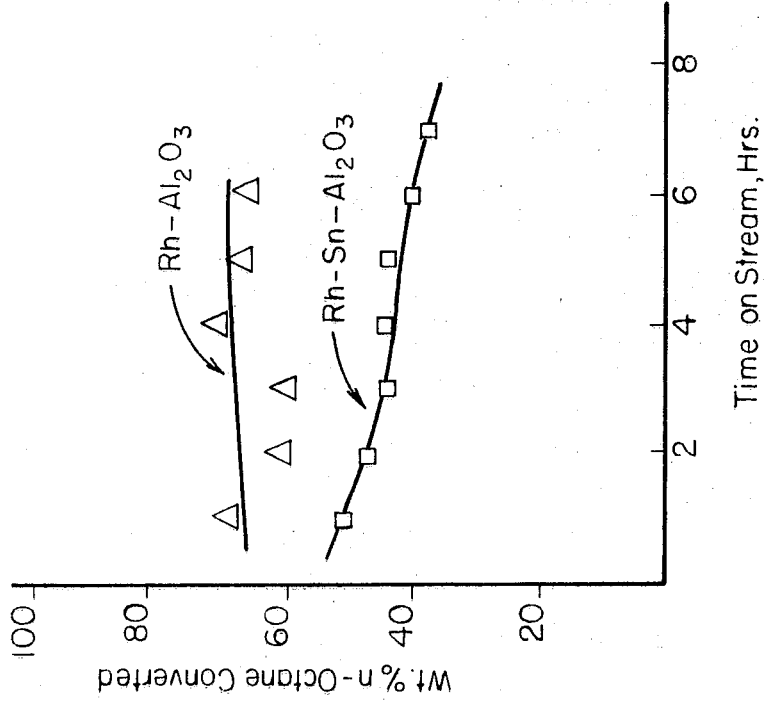

The conversion was effected at 932° F. and 400 p.s.i.g. a liquid hourly space velocity of approximately 1.0 and a hydrogen to hydrocarbon ratio of approximately 4:1. The observations are set out in FIGS. 2 and 3. FIG. 2 is a plot of time-on-stream against percent wt. n-octane conversion (excluding conversion to methyl heptanes); and FIG. 3 is a plot of time-on-stream against percent wt. aromatics formed. As appears from these figures selectivity for aromatic formation of the Rh/Sn catalyst was about five times that of the Rh-alone catalyst, although total conversion over the catalyst in accordance with the invention was lower. Under the same experimental conditions a Sn-$Al_2O_3$ catalyst was totally inactive.

EXAMPLE 12

Two catalysts were prepared: first a Pt-on-acidic-alumina catalyst, according to the prior art; and, second, a platinum-tin catalyst obtained by treatment of the first catalyst with an acetone solution of $SnCl_2 \cdot 2H_2O$. The characteristic orange coloration of the platinum-tin complex ion was manifested on such treatment.

Figure 4:
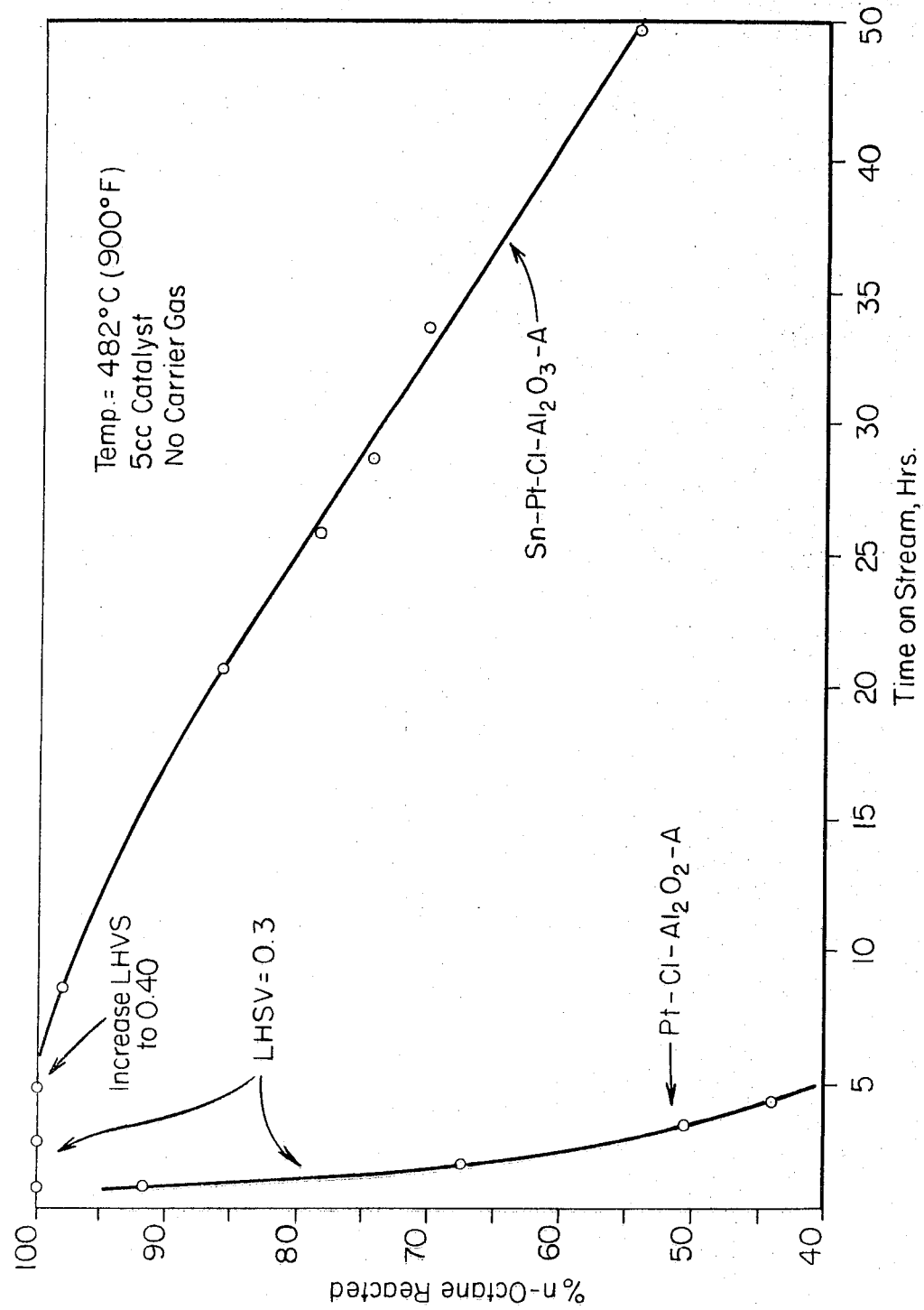

The second catalyst (which was in accordance with the invention) assayed: 0.83% Pt, 2.0% Sn, 1.61% Cl (a Pt/Sn atomic ratio of 4.0). Since the Cl content calculated for $(PtCl_6)(4SnCl_2)$ is 1.58% it appears that all chlorine involved in the catalyst preparation was retained in the used catalyst.

n-Octane was passed over each of the two catalysts thus prepared at 900° F. and atmospheric pressure (in the absence of any carrier gas). FIG. 4 depicts the respective conversions as a function of Time on Stream.

Not only was the conversion activity retained far longer with the Pt-Sn catalyst, but in addition aromatic selectivity was similarly superior to that of the Pt-alone catalyst. This improved selectivity is at least partly accounted for by the low carbon skeleton isomerization activity of the catalyst, a property which is valuable in commercial reforming processes where nearly all the feedstock (except cyclo-$C_5$ and paraffins with no carbon chain of 6 or more carbon atoms) can be converted to aromatics before using the more severe dual-functional metal-acid catalytic process.

EXAMPLE 13

This example demonstrates that care has to be exercised in the choice of complex ion used in preparation of catalysts according to the invention. Many such ions which commend themselves include catalyst poisons or deactivators such as sulphur or phosphorus and are thus unsuitable intermediates. Table V shows the effect upon n-octane dehydrocyclization activity and selectivity of this and other variables in catalyst preparation.

TABLE V

Dehydrocyclization of n-octane over bi-metallic catalysts

| Run | Metals | Preparative method [1] | Support | Aromatization, wt. percent | Isomerization of paraffin feed | Aromatic distribution | | |
|---|---|---|---|---|---|---|---|---|
| | | | | | | $C_6$ | $C_7$ | $C_8$ |
| (a) | Ni-Sn | A | $Al_2O_3$(acidic) | ~0 | Traces | | | |
| (b) | Pt-Ni | A | $SiO_2$ | 14 | do | 2 | 3 | 9 |
| (c) | Pt-Co | A | $SiO_2$ | 17 | do | Tr. | Tr. | 17 |
| (d) | Pt-Sn | $C^2$ | $Al_2O_3$(non-acidic) | 80 | do | | | 80 |
| (e) | Pt-Sn | $C^3$ | do | 89 | do | | | 89 |
| (f) | Pd-Sn | C | do | 5 | do | | | 5 |
| (g) | Rh-Sn | C | do | 31 | do | | | 31 |
| (h) | Pt-Cu | A | $SiO_2$ | 7 | do | | | 7 |
| (i) | Pt-Sb | A | $SiO_2$ | ~0 | do | | | |
| (j) | Ni-Sn | $C^4$ | $Al_2O_3$ | ~0 | do | | | |
| (k) | Ni-Sn | $C^4$ | $SiO_2$ | ~3 | do | | Tr. | 3 |

[1] A=separate impregnations: C=with anion complex, e.g. $(PtCl_5SnCl_3)^{2-}$.
[2] 1.5 cyclooctadiene complex of $(Pt_3Sn_8Cl_2O)^{4-}$ complex.
[3] Impregnate with $(Pt_3Sn_8Cl_2O)^{4-}$ complex (see J. Inorg. Chem., 5, 109, (1966).
[4] Impregnate with bis(triphenylphosphine) $NiClSnCl_3$ complex (see J.A.C.S., 89, 1600, (1967).

Note the extremely low activity of runs (j) and (h) where a phosphorus-containing complex was used in catalyst preparation. However, note that even the low activity catalysts preserved selectivity for $C_8$ aromatics.

EXAMPLE 14

Bis (ethylenediamine) dihydroxorhenium (V) hexachloroplatinate (IV) — $(Re(en)_2(OH)_2)_2(PtCl_6)_3$ — was prepared by the method described in Inorganic Synthesis VIII, pp. 173–176. A quantity of the complex calculated to furnish approximately 0.35% wt. Pt in the final catalyst was dissolved in 1 quart of dimethylformamide, and the solution was used to impregnate 100 g. of α-alumina monohydrate. The solvent was then removed by evaporation to yield a platinum-rhenium catalyst.

A further catalyst, containing quantities of platinum, rhenium and alumina identical to those of the platinum-rhenium catalyst prepared in the preceding paragraph, was made by separate impregnations of the identical alumina with $H_2PtCl_6$ and $H_2ReO_7$ with drying after each impregnation.

The two catalysts were compared for n-octane conversion at 900° F., atmospheric pressure and 0.4 LHSV, without added hydrogen. Conversion is plotted against time on stream in FIG. 5.

Run A in FIG. 5 was carried out with the freshly prepared catalyst in which the platinum and rhenium had been deposited on the alumina from the complex containing both metals. The rapid fall-off in activity was due to the fact that removal of the dimethylformamide solvent used in the preparation of the catalyst caused deposition of coke (formed from the solvent) on the catalyst.

This coke was removed by regeneration in air at 950° F., without control of water level. The remarkable stability of the catalyst to such severe regeneration conditions is shown by Run B of FIG. 5 where the activity is still significant after 32 hours operation. By contrast, Run C shows the rapid fall-off in activity of the further catalyst prepared by separate precipitations of platinum and rhenium.

What is claimed is:
1. A method of preparing a supported bimetallic catalyst containing a platinum group metal catalytically active in hydroprocessing reactions, comprising intimately associating a porous alumina with a compound capable on ionization of furnishing a complex ion containing both said platinum group metal and tin.
2. Method according to claim 1 wherein said metal is platinum or rhodium.
3. Method according to claim 1 wherein said complex is $(PtCl_5SnCl_3)=$ or $(Pt_3Sn_8Cl_2O)^{-4}$.
4. A platinum group metal catalyst promoted with tin chloride intimately associated with porous alumina prepared by the method of claim 1.

References Cited
UNITED STATES PATENTS

| | | | |
|---|---|---|---|
| 3,531,543 | 9/1970 | Clippinger et al. | 252—466 PT |
| 3,449,237 | 6/1969 | Jacobson et al. | 252—466 PT |
| 2,930,766 | 3/1960 | Lacey | 252—466 PT |
| 3,702,293 | 11/1972 | Hayes et al. | 252—455 Z |
| 3,578,584 | 5/1971 | Hayes | 252—442 X |
| 3,702,294 | 11/1972 | Rausch et al. | 252—466 PT |

CARL F. DEES, Primary Examiner

U.S. Cl. X.R.

252—466 PT